UNITED STATES PATENT OFFICE.

HENRI STORCK AND FARNHAM MAXWELL LYTE, OF ASNIÈRES, NEAR PARIS, FRANCE.

IMPROVEMENT IN THE MANUFACTURE OF ACID PHOSPHATES.

Specification forming part of Letters Patent No. 137,635, dated April 8, 1873; application filed February 27, 1873.

*To all whom it may concern:*

Be it known that we, HENRI STORCK and FARNHAM MAXWELL LYTE, of Asnières, near Paris, France, have invented improvements and modifications in the treatment and purification of crude phosphoric acid, and in the production of soluble phosphates; also, for the manufacture of phosphorus and the treatment of certain residues resulting therefrom and phosphate of aluminium; and we do hereby declare that the following is a full, clear, and exact description of the same.

The invention will be first fully described and then pointed out in the claim.

Crude phosphoric acid or soluble acid phosphates (superphosphates) are usually produced by acting on the tribasic phosphate of calcium, phosphorites, coprolites, bone-ash, or other forms of so-called natural phosphates with sulphuric acid.

It has hitherto been found difficult to extract from the phosphoric acid or superphosphate thus produced the sulphuric acid employed in the attack.

The object of the present improved process is the extraction of this sulphuric acid.

We take mineral phosphates, bone-earth, or any other form of phosphate of calcium, more or less impure, and treat them with the quantity of sulphuric acid requisite to convert them into phosphoric acid, or a soluble acid phosphate of calcium; the former, remaining in solution, is drawn off. This liquid is now treated with hydrate of barium, carbonate of barium, sulphide of barium, or any convenient compound of barium, by means of which the sulphuric acid may be withdrawn from the solution of phosphoric acid; or the acid phosphate, oxides, or salts of lead or strontium may also be employed for this same purpose, but are less efficacious.

Another method consists in forming an acid phosphate of barium, lead, or strontium, and adding this, in sufficient quantity, to the crude phosphoric acid or superphosphate.

By either of these means the sulphuric acid contained in the crude phosphoric acid is precipitated, and the purified phosphoric acid or superphosphate may be drawn off by decantation or filtration.

We may here specify that the presence of any base in combination with the phosphoric acid renders the extraction of the sulphuric acid either more imperfect or slower, so that, in practice, it is more convenient to add sufficient sulphuric acid in the attack, so as to precipitate as much as possible the lime contained in the natural phosphate under treatment.

The phosphoric acid thus purified by what we may term "barytation," may be employed for the manufacture of phosphate of sodium, neutral or tribasic phosphate of ammonia, or other soluble phosphates exempt from sulphuric acid, as for the manufacture of a paste suitable for the production of phosphorus.

In illustration of the above we proceed to describe our process of manufacturing phosphate of sodium.

After barytation we evaporate the purified phosphoric acid to a density of about 15° to 16° Baumé, neutralize the evaporated liquid with carbonate of sodium, filter off the phosphate of iron and phosphate of aluminium, insoluble residues formed during neutralization bring the liquid to a density of about 23° to 26° Baumé, and crystallize the phosphate of sodium.

In making neutral phosphate of ammonia we concentrate our barytated phosphoric acid to about 22° to 23° Baumé; then neutralize with ammonia and separate the iron, alumina, and unsoluble phosphates by filtration. We concentrate to the crystallizing-point, and then, if the liquid has become acid by loss of ammonia, we neutralize again either with ammonia or by adding some of the tribasic salt, and then we crystallize.

If we desire to make the tribasic phosphate of ammonia, we first neutralize the barytated acid as for the neutral salt, filter, then add to the solution enough ammonia to precipitate the tribasic salt, which we separate by filtration or pressure from the mother-liquor.

In all these case, by the employment of barium, we separate the sulphuric acid while the liquor is still acid, and it is advantageous, as above stated, to have the least possible of any base in combination with any portion of the phosphoric acid during barytation.

Acid phosphates can, however, be also deprived of their sulphuric acid where absolutely requisite, but the process is rendered slower in proportion as more of the acid is saturated or combined. In either case we have a residue of more or less phosphate of iron and phosphate of alumina precipitated together with more or less undecomposed phosphate of calcium, and often some phosphate of barium, if the barytation has been carried to even a slight excess, (the greater portion, however, of the latter compound precipitates as acid phosphate during the concentration of the acid liquid.)

These residues we treat in one of three ways: First, we treat them with carbonate of sodium and convert the phosphates of iron and aluminium into oxides, which are to be treated with water and a little caustic soda; the aluminium dissolves as aluminate of sodium, while the iron remains insoluble; the phosphoric acid may be precipitated from the liquid by lime. Second, we boil the residues with carbonate of sodium, whereby the phosphoric acid is partly extracted from its combination with the iron, but the phosphate of aluminium remains undecomposed. Third, we treat the residues with hydrochloric acid, adding either a salt of calcium or some lime; but chloride of calcium answers well; or we add to the hydrochloric solution of the residues a salt of barium or some oxide of barium. On concentrating the liquor to 44° Baumé, the acid phosphate of calcium crystallizes, or the acid phosphate of barium, as the case may be.

We can further modify our process as follows: First, we can employ sulphate of ammonia to produce alkaline phosphates of the same base by double decomposition in treating the acid phosphates of calcium, barium, strontium, or lead with sulphuric acid; secondly, we can form the said acid phosphates—also alkaline, earthy, and metallic oxides, especially the acid phosphate of calcium—in order to apply them to the double decomposition in question, by adding lime or any of the oxides above mentioned, or carbonate of calcium, or one or other of the carbonates of the oxides thereof, to the acid liquor obtained from phosphorites or bones when acted upon by sulphuric acid, in order to produce a liquor of a degree of saturation suitable for the double decomposition in question; thirdly, we can extract the sulphuric acid contained in solutions of alkaline phosphates, superphosphates, and phosphoric acid, by a treatment with phosphates of lead, phosphates of barium, or phosphates of strontium, whether the said phosphates are produced in the body of the liquor beforehand or are formed by an addition of caustic baryta, carbonate of barium, or by the oxide or carbonate of lead, or other combination of lead or barium, or by the correspondent salts or oxides of strontium, &c.; fourthly, by extracting the iron and alumina from the soluble phosphates by a methodic precipitation in neutralizing exactly the desulphated but still acid liquor obtained from this our improved method; fifthly, by extracting and precipitating the phosphoric acid from the liquor properly concentrated in the state of basic phosphate of ammonia ($3AzH_4,OPhO_5$) by an addition of ammonia to the liquor resulting from treatment as described under paragraphs 1 2 3 4; sixthly, by applying gaseous ammonia for producing the above precipitate, ($3AzH_4,OPhO_5$.)

We will now proceed to describe by way of example the modified mode of manufacturing the tribasic phosphate of ammonia ($3AzH_4,OPhO_5$) conformably to our method. We take a certain quantity of sulphuric acid properly diluted, into which we throw little by little, and with stirring, the phosphates to be decomposed in the pulverulent state, (phosphorites, coprolites, bone-earth, animal-charcoal, &c.,) and after sufficient stirring and mixing we decant the liquor. This liquor we concentrate, and, after bringing it to a required degree of concentration, throw in a certain quantity of lime or carbonate of calcium, so as to completely convert all or nearly all the free phosphoric acid in it into acid phosphate of calcium. We then treat this liquor, either hot or cold, with sulphate of ammonium, whereby is effected the double decomposition hereinbefore alluded to—that is to say, we have produced in the liquor a certain amount of acid phosphate of ammonium and a precipitate of sulphate of calcium, which we separate by well-known means. We obtain a liquor containing acid phosphate of ammonium mixed with impurities from the reaction of the sulphuric acid and sulphates, and also natural impurities, such as iron, soluble silica, alumina, &c., which are to be eliminated, but most part of the lime is got rid of. To effect this, and above all to get clear of the sulphuric acid, we treat the liquor with phosphate of barium, lead, or strontium, which forms a corresponding insoluble sulphate; or we form said phosphates in the liquor by adding thereto oxides of barium, lead, or strontium, or their carbonates or other salts of barium, lead, or strontium, capable of producing phosphates of the same, decomposable by sulphate of ammonium. We separate this precipitate; then to remove the other impurities we neutralize by ammonia, and thus separate them in the state of precipitate. The liquor is then formed solely of neutral phosphate of ammonium. We now either pass a current of ammoniacal gas or add liquid ammonia to produce the tribasic phosphate, ($3AzH_4OPhO_5$.)

Claims.

1. The method of treating the residues hereinbefore described, as and for the purpose set forth.

2. The method of producing soluble acid phosphates by attacking earthy phosphates, especially phosphate of calcium, with properly-diluted phosphoric acid, subsequently precipitating the earthy matter by means of alkaline sulphates, (as, for instance, by sulphate of ammonium,) and the extraction of the sulphuric acid contained in the residual liquor by treatment with the phosphate of barium, lead, or strontium, or the carbonates or other suitable salts of these bases, substantially as and for the purposes hereinbefore specified.

FARNHAM MAXWELL LYTE.
HENRI STORCK.

Witnesses:
EMILE DUHAN,
CHARLES DEMOS.